June 30, 1953 R. W. DAYTON 2,643,671
SPRING LOADED POP-SAFETY VALVE
Filed June 21, 1952
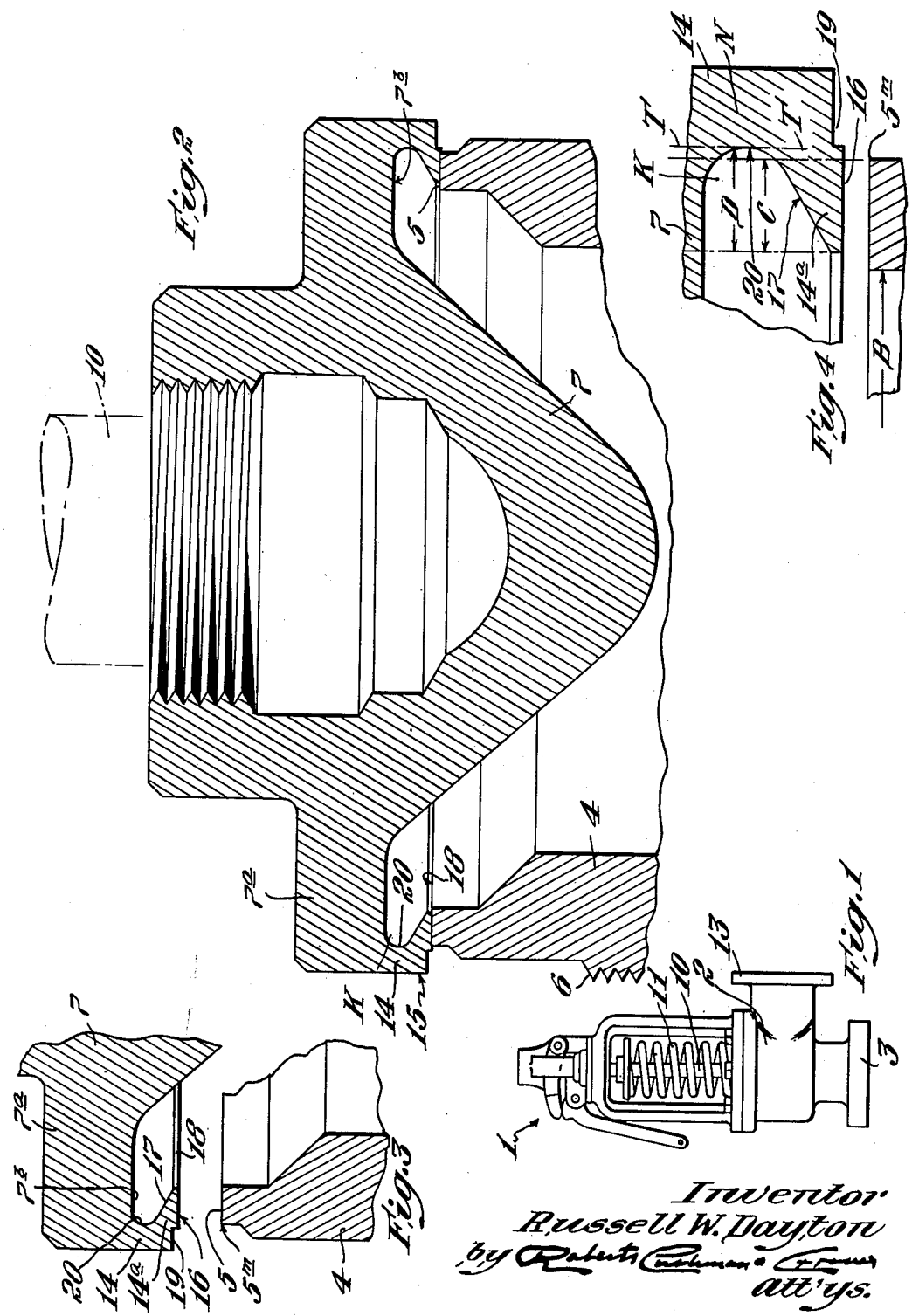
Inventor
Russell W. Dayton
by Roberts Cushman & Grover
att'ys.

Patented June 30, 1953

2,643,671

UNITED STATES PATENT OFFICE 2,643,671

SPRING LOADED POP-SAFETY VALVE

Russell W. Dayton, Columbus, Ohio, assignor, by mesne assignments, to Manning, Maxwell & Moore, Incorporated, New York, N. Y., a corporation of New Jersey Application June 21, 1952, Serial No. 294,879

7 Claims. (Cl. 137—469)

This invention pertains to spring-loaded pop safety valves. While of broader utility it is especially valuable as embodied in a safety valve for use with saturated steam or other imperfect gas, whether hot or cold, and has for its principal object a novel method of minimizing leakage and the provision of a valve which does not leak even at high pressures or when the pressure nears the popping point. The present application is a continuation-in-part of my copending application for Letters Patent Serial No. 660,650 filed April 9, 1946.

The problem of leakage in steam safety valves has long been recognized by designers as one of the most difficult which they have to solve. One principal reason for this difficulty is found in the fact that in safety valves, as compared with shutoff valves or the like, the contacting surfaces of the head and seat are held together only by the difference in loading between the pressure imposed by the spring and the pressure of the fluid. For instance, assuming a pop safety valve having a seat area of one square inch and set to pop at a pressure of 1500 lbs. per square inch, the working fluid pressure would normally be approximately 1440 lbs. so that the normal available loading force for holding the head in contact with the seat is only 60 lbs. per square inch. Obviously such an effective loading pressure is wholly insufficient to mould the contacting faces of an ordinary head and seat so as to iron out any irregularities and thus to insure a leak-tight contact. As the pressures increase, the problem becomes more and more serious. Furthermore, if leakage is once established, the flow of steam at extremely high velocity through the leak quickly erodes the opposed surfaces of the seat and head so that they no longer even approximate contact, and the leak becomes permanent and progressively worse.

Many attempts have been made to solve the problem, but previously without success; for instance it has been proposed very carefully to finish the contacting surfaces of the seat and head so as to avoid any relative creep of the surfaces in response to temperature changes, and thus to avoid abrasion of the surfaces by contact with each other and the initiation of leakage. However, experiment shows that so long as the valve is actually tight, the temperature is substantially uniform all of the way around the seat, so that temperature differentials do not actually produce creepage and thus can not be the cause of initial leakage. On the other hand, extended experiments (in which a large number of thermo-couples were distributed about the periphery of the valve seat to facilitate accurate temperature measurements) have shown that even the slightest leak, once initiated, rapidly develops into a very serious leak, not in the first instance by reason of the scoring or erosion of the opposed surfaces, but because the outwardly flowing and rapidly expanding fluid produces a temperature drop in the region of the leak with the result that the metal parts contract locally, thus immediately increasing the dimensions of the leak orifice so that the leak almost instantly becomes larger.

While careful finishing of the contacting surfaces my help in avoiding the initiation of leaks, it is very difficult as a practical matter to maintain such perfection of the contacting surfaces as to avoid leaks of what may be termed "microscopic" size, and as above noted, the usual loading is not sufficient to mould the contacting surfaces into such intimate contact as to eleminate minor imperfections. Thus under almost all practical conditions of service the contacting surfaces of the head and seat contain minor imperfections which, at least under high pressures and particularly when the pressure approaches the popping point, permit the escape of steam in minute quantities but sufficient by reason of the cooling effect above referred to, to cause the parts to contract, thus increasing the leak orifice and progressively resulting in more and more leakage.

While somewhat the same effect is observable when the pressure fluid is a perfect or substantially perfect gas, for example, nitrogen or superheated steam, such perfect or nearly perfect gases have far less cooling effect when expanding than saturated steam, and thus leakage from the above cause, when dealing with perfect or nearly perfect gases, it not so important. Thus, as above noted, the present invention is particularly valuable when dealing with such an imperfect gas as saturated steam, although it is obvious that somewhat improved effects result from the employment of the invention when a perfect gas constitutes the pressure medium. In this connection it is of interest to note that when the pressure of a perfect gas, for instance nitrogen, is gradually increased, the valve will show only moderate leakage until the popping point is reached, the leakage increasing very gradually with pressure increase. On the other hand, the same experiment performed with saturated steam shows that as the pressure increases the leakage first increases very gradually, but, at some pressure well below the popping point, the leakage very suddenly increases to an extremely high value which is maintained until the fluid pressure reaches the popping point. Specifically it was found that steam leakage at 10% below the popping point was approximately six hundred times greater than nitrogen leakage, while at the blow-down pressure steam leakage was approximately ten thousand times greater than nitrogen leakage. It is thus very evident that the very pronounced cooling effect resultant from the sudden expansion of the saturated steam is responsible for a great part at least of the observed leakage in a pop safety valve when the pressure rises toward the popping point. Obviously, similar effects result, whether the pressure fluid be initially hot, like saturated steam, or initially sensibly cold, like a gaseous refrigerant which is further cooled by expansion Thus, when herein reference is made to "pressure fluid" it is to be understood as referring to a gaseous medium, whether a perfect or imperfect gas and whether initially hot or cold.

Having thus established that irregular cooling due to leakage is at the root of the leakage problem, various possibilities for solving this problem have been considered. First, and perhaps the most obvious, is that of so finishing the contacting surfaces that even microscopic leakage cannot take place. However, as above noted, this seems to be an impractical solution because of the inherent difficulties of maintaining perfertion of the contacting surfaces during use. Secondly, the effects of localized cooling might perhaps be to some extent nullified by the employment of materials having a very low coefficient of expansion. Such a material, for example, might be a high temperature Invar having an expansion coefficient of about $4 \times 10^{-6}$ ins./in./deg. C. While materials of low thermal expansion appear to have possibilities from the theoretical standpoint, there are some practical disadvantages connected with their use. A third mode of solving the problem, and one which has been found wholly practical and adequate, consists in so designing the contacting surfaces of the seat and head as to insure rapid heat conduction, and the location of the surfaces in such relation to the pressure fluid that the neighborhood of leaks will be kept at all times substantially at the temperature of the fluid within the container, and so that, even at the low effective loading as the popping point is approached, the surfaces will make a firm and leaktight contact. One mode of designing the contacting surfaces to obtain these effects will be pointed out in the following more detailed description and by reference to the accompanying drawings wherein Fig. 1 is a diagrammatic side elevation of a safety valve embodying the present invention;

Fig. 2 is a fragmentary diagrammatic section, to larger scale, showing a portion of the valve head and seat bushing, the valve being closed;

Fig. 3 is a fragmentary radial section through the valve head and seat bushing of Fig. 2, showing the valve open; and Fig. 4 is a diagram illustrative of certain desirable constructional relationships.

Referring to Fig. 1 of the drawings, the numeral 1 designates generally a pop safety valve, such as is commonly employed on steam boilers or the like, for relieving excess pressure. This valve comprises a casing 2 having the attaching flange 3 at its lower end, and having arranged within it the seat support 4 (Fig. 2) which may, for example, be a bushing in general similar to that disclosed in the patent to Graesser et al., No. 1,668,453, dated May 1, 1928, although the particular form of seat support is immaterial so far as the present invention is concerned.

The seat support or bushing 4 has the flat, horizontal annular seat surface 5 at its upper end, and is externally screw-threaded at 6 (Fig. 2) for the reception of a blow-down ring (not shown).

The valve head comprises the disk member 7 which is guided in customary manner to move vertically within the casing toward and away from the seat 5. The valve head is urged downwardly toward the seat, in opposition to upward force exerted by the pressure fluid, by the spindle 10 (Fig. 1) and is loaded by the coiled compression spring 11 housed within the bonnet portion of the valve casing. The disk member 7 is located within a chamber in the valve casing, the latter having an outlet flange 13 (Fig. 1) to which a delivery pipe may be attached. The disk member 7 of the valve head, as is customary in valves of this kind, is thick and rigid so as to withstand, without distortion, the forces exerted by the spring and pressure fluid. The main or body portion of the disk 7 has a downwardly directed, marginal, annular flange 14 whose root or base is integral with the head proper. The outer surface 15 of this flange is flush with the cylindrical outer surface of the horizontal portion 7a of the valve head, but the lower part 14a of the flange is so extended inwardly in a radial direction as to underlie the under surface 7b of the part 7a of the valve head, the bottom surface 16 of the part 14a of the flange being accurately flat and horizontal. The upper surface 17 of the inwardly extending portion 14a of the flange 15 slopes at an angle of the order of 30° to the horizontal and terminates at a narrow cylindrical inner edge surface 18 (Fig. 2) of a diameter greater than the inner diameter of the flat seat surface 5 of the seat bushing. The outer edge 5m of the seat surface 5 is of a diameter less than the outer diameter of the flat under face 16 of the flange so that the latter overlaps the seat surface when the valve is seated. The outer edge of the flat surface 16 of the flange 15 is preferably rabbeted to provide a clearance 19. The upper, inclined surface 17 of the part 14a of flange 14 merges, by means of a curved surface 20, with the substantially flat and horizontal under surface 7b of the portion 7a of the valve head, thereby defining an annular channel K which is filled with the pressure fluid when the valve is closed. Although the slope of the surface 20 is preferably approximately 30° to the horizontal, it is contemplated that the slope of this surface may vary 10° ± from 30°.

The undercut or radial depth D (Fig. 4) of the arcuate surface 20 is such that a vertical tangent T—T to said arcuate surface lies outside of the right cylindrical geometrical surface defined by the outer edge 5m of the seat 5. In other words, the narrowest portion N (Fig. 4) of the flange 14 is outwardly beyond the outermost point of contact of the surface 16 with the seat 5. Experiment has shown that a ratio of D to C of 1.32 to 1.00 (that is 132%) is very good, so far as leak prevention is concerned, but a valve so designed is not as strong structurally as is desirable. On the other hand, while a ratio of D to C of 50% insures adequate strength structurally, it is not so effective from the standpoint of leaktightness as when a higher ratio is employed. Optimum effects, so far as leaktightness of the valve is concerned, coupled with adequate structural strength, appear to be obtained by the use of a ratio of D to C of 1.10 to 1.00 (that is to say 110%).

It is contemplated that the flange 14 (or at least the seat contacting portion thereof) may be of a metal, for instance, Invar, which has a very low coefficient of thermal expansion, thereby further reducing the possibility of leakage, though excellent results are attained when the flange is integral with and of the usual metal used in making the head proper.

When the valve is closed, the inner surfaces 17 and 20 are freely exposed to the static pressure of fluid within the annular channel K, the surface 17 extending upwardly and outwardly as above described to a distance exceeding the radial width C (Fig. 4) of contact between the surface 16 with the seat 5, so that the surface 16 is kept hot by rapid conduction of heat through the substance of the flange, the flange being so thin (as compared with the other portions of the valve head) that heat conduction is very rapid. Thus variations in temperature of the contact surface of the flange due, for example, to localized leakage, are reduced to a minimum. If a microscopic leak does develop, the rapid transfer of heat through the substance of the flange substantially compensates for the decrease in temperature due to the sudden expansion of the escaping steam so that the leak does not tend to increase by contraction of the parts as it does under ordinary circumstances.

If the flange 14 be made of a material having a low thermal expansion, such slight drop in temperature at the location of any leak which may occur in spite of the provision of rapid heat transfer, is nullified by the reluctance of the metal to contract in response to such slight temperature drop.

Although the portion 14a of the flange which extends inwardly over the valve seat may be very thin in order to facilitate rapid heat transfer, this thin portion merges with a heavy base (the part 7a of the valve head) which is capable of absorbing the shock of closing, and when the valve is closed and under the normal spring load, the seat surface 16 remains accurately horizontal and parallel to the surface 5 without appreciable deflection or distortion.

While one desirable embodiment of the invention has herein been illustrated by way of example it is to be understood that the invention is broadly inclusive of any and all modifications falling within the scope of the appended claims.

I claim:

1. A pop safety valve for use with high pressure gaseous fluid, said valve comprising a rigid annular seat, an upwardly movable valve head normally exposed at its underside to pressure fluid tending to lift it from the seat, and a loading spring arranged to exert downward force against the head thereby normally to keep the head seated, the head being free to lift from the seat except for the force exerted by the spring, the head comprising a rigid body capable of withstanding, without substantial distortion, the loads imposed by the pressure fluid and spring, the head comprising an annular flange which is joined at its root portion to the body of the head and which extends downwardly and inwardly with its free inner edge portion spaced below the body, the flange having a finished under surface for contact with the seat, the upper surface of the flange merging with the under surface of the body of the head to form an annular channel which is filled with the pressure fluid when the valve is closed, the free edge portion of the flange being of lesser diameter than its root portion and so thin as rapidly to transmit heat from the pressure fluid within said channel to the seat-contacting surface of the flange, the radial depth of the annular channel, measured outwardly from a geometrical, cylindrical surface defined by the inner edge of the seat-contacting surface of the flange, exceeding the radial width of the surface of contact between the flange and seat.

2. A pop safety valve according to claim 1 wherein the depth of the annular channel formed by the flange, as measured outwardly from the cylindrical geometrical surface defined by the inner edge of the seat contacting surface of the flange is related to the radial width of the surface of contact between the seat and flange in approximately the proportion of 1.10 to 1.00.

3. A pop safety valve according to claim 1 wherein the depth of the annular channel formed by the flange, as measured outwardly from the cylindrical geometrical surface defined by the inner edge of said seat contacting surface of the flange is from 50% to 132% of the radial width of the surface of contact of the flange with the seat.

4. A pop safety valve according to claim 1 wherein that portion of the flange which has the seat contacting surface is connected to the root portion of the flange by a horizontally narrow neck which, in vertical section, has an arcuate inner surface so located that a vertical tangent thereto lies outwardly beyond the outer edge of the seat.

5. A pop safety valve according to claim 1 wherein the lower portion of the inner surface of the flange slopes upwardly and outwardly from its free inner edge at an angle of the order of 30° to the horizontal.

6. A pop safety valve according to claim 1, further characterized in that the inner free edge of the flange is of a diameter greater than that of the inner edge of the seat with which it contacts.

7. A pop safety valve according to claim 1, further characterized in that the outer edge of the flat, horizontal lower face of the flange is of a diameter greater than that of the outer edge of the seat.

RUSSELL W. DAYTON.

No references cited.